US006938070B2

(12) United States Patent
Esposito (10) Patent No.: US 6,938,070 B2
(45) Date of Patent: Aug. 30, 2005

(54) CONFLICT RESOLUTION FOR COLLABORATIVE WORK SYSTEM

(75) Inventor: Nicolas Esposito, Suresnes (FR)

(73) Assignee: Dassault Systemes, Suresnes Cedex (FR)

( * ) Notice: Subject to any disclaimer, the term of this patent is extended or adjusted under 35 U.S.C. 154(b) by 701 days.

(21) Appl. No.: 10/021,916

(22) Filed: Dec. 17, 2001

(65) Prior Publication Data

US 2003/0115268 A1 Jun. 19, 2003

(51) Int. Cl.$^7$ .............................................. G06F 19/00
(52) U.S. Cl. ...................... 709/205; 709/221; 370/249; 370/509
(58) Field of Search ............................... 709/221, 203, 709/205, 219; 370/249, 324, 509; 714/707, 751, 758

(56) References Cited

U.S. PATENT DOCUMENTS

| 5,337,407 | A | | 8/1994 | Bates et al. .................. 345/751 |
| 5,485,579 | A | * | 1/1996 | Hitz et al. ................... 709/221 |
| 5,519,627 | A | | 5/1996 | Mahmood et al. ............ 716/18 |
| 5,960,173 | A | | 9/1999 | Tang et al. .................. 709/201 |
| 5,973,678 | A | | 10/1999 | Stewart et al. ............... 345/184 |
| 6,323,863 | B1 | | 11/2001 | Shinagawa et al. .......... 345/441 |
| 6,687,318 | B1 | * | 2/2004 | Kaup et al. .................. 375/364 |
| 2002/0183878 | A1 | * | 12/2002 | Chartier et al. ............... 700/98 |

FOREIGN PATENT DOCUMENTS

DE                1271412        *     1/2003

OTHER PUBLICATIONS

Engineering Applications: A collaborative framework for integrated part and assembly modeling; Rafael Bidarra; Proceedings of the 7$^{th}$ ACM symposium on Solid modeling and applications; Jun. 2002.*

W. Keith Edwards, Flexible Conflict Detection and Management in Collaborative Applications, 1997.

Saul Greenberg and David Marwood, Real Time Groupware as a Distributed System: Concurrency Control and its Effect on the Interface, 1994.

Bentley et al., Basic Support for Cooperative Work on the World Wide Web, 1997.

Dourish and Bellotti, Awareness and Coordination in Shared Work Spaces, 1991.

Greenberg and Roseman, Groupware Toolkits for Synchronous Work, 1996.

Ricardo Galli, Data Consistency Methods for Collaborative 3D Editing, 2000.

Bhola, Banavar, and Ahamad, Responsiveness and Consistency Tradeoffs in Interactive Groupware, 1998.

Bhola and Ahamad, Phase Timestamping for Replica Consistency in Interactive Collaborative Applications, 1999.

* cited by examiner

*Primary Examiner*—Kamini Shah
(74) *Attorney, Agent, or Firm*—James V. Mahon; Clifford Chance US LLP (57) ABSTRACT

Data objects replicated at multiple computers can be synchronized using synchronization messages exchanged over a network. The synchronization messages include a current operation parameter and a previous operation parameter that are processed to determine how and when the replicated data objects should be manipulated. The current operation parameter identifies an operation and associated data to be executed at a receiving computer to synchronize the receiving computer's data object. An execution stage parameter is also sent to identify a correct execution timing for the operation. The previous operation parameter identifies a preceding operation executed by the sending computer, an execution stage at which the preceding operation was executed, and the computer first originating the preceding operation (e.g., an identify of a third computer that first initiated the operation). Data in the synchronization message can also indicate a unique priority level of the sending computer with respect to the other computers.

18 Claims, 5 Drawing Sheets

CONFLICT RESOLUTION FOR COLLABORATIVE WORK SYSTEM

BACKGROUND OF THE INVENTION

Collaborative applications, often referred to as groupware applications, permit two or more people, each using different computers, to share a common view of a virtual workspace and to manipulate a shared data object in that workspace. Typically, a copy of the collaborative application is executed at each user's computer to simulate the workspace and to manipulate a local copy of the data that is being collaboratively manipulated and displayed. For example, a collaborative drawing application may display the same drawing at each of a group of computers, and user's at each of those computers can change the drawing as well as view changes made by other users. One way in which this is done is to provide each user's computer with a local copy of the shared data object. The shared data object is then manipulated by the user's local copy of the collaborative application. The local copy of the shared data object is synchronized with copies of the shared data object that are maintained at other computers using synchronization messages exchanged between those computers. For example, in a shared word processing application, if a user at a first computer deletes a particular paragraph of a document, a message can be sent to other computers instructing copies of the collaborative application at those computers to delete the same paragraph from their local copy of the shared data object.

One problem facing a groupware application designer is to ensure that all copies of the shared data object are maintained in a consistent state. If proper controls are not in place, different manipulations of the shared data object may arise due to simultaneity conflicts and temporal errors. These errors, also referred to as ordering or sequencing errors, can occur when synchronization messages are received and/or processed in different orders at different computers.

A temporal error occurs when synchronization messages arrive at different computers in different orders. This can occur, e.g., due to different network delays between computers. As a result, different sequences of synchronization operations may be performed at different computers. Concurrency controls can address temporal errors by ensuring that operations at different computers are processed in a way that yields a consistent result. Broadly speaking, such concurrency control systems can be are characterized as being either "optimistic" or "pessimistic" (i.e., "non-optimistic"). Pessimistic systems, such as record locking and semaphores, can ensure that operations are both received and executed in their proper order. However, pessimistic systems may have a high delay in accessing the shared data object and this delay may impede the use of pessimistic controls in real-time collaborative systems.

Figure 1:
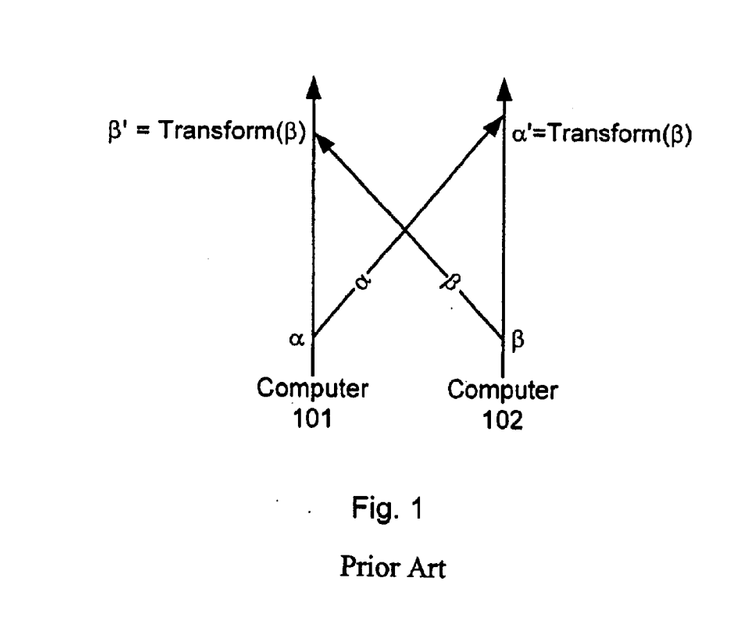
FIG. 1 is a message flow diagram.

Optimistic systems allow operations to be received and/or executed out-of-order. Optimist systems may have a relatively low delay compared to pessimistic systems, thus improving the real-time user experience. However, optimistic systems may need to employ complex error detection and repair to deal with out-of-order operations. One correction approach is to queue operations that arrive too early, or to undo out-of-order operations that have been executed, and then re-execute them in-order. Another approach is to use transformations to modify received out-of-order operations into a new set of operations. In the transformation approach, transformations can be applied to operations so that different execution sequences produce the same result. FIG. 1 shows two message processing sequences (shown, respectively, as the left and right side of FIG. 1). The left side sequence shows operation $\alpha$ followed by $\beta'$ (a transformation of the operation $\beta$) being performed at a computer 101. This sequence has the same effect as the sequence shown on the right-side of FIG. 1 in which the operation $\beta$ is followed by $\alpha'$ (a transformation of the operation $\alpha$) at computer 102. The operation transformation method illustrated by FIG. 1 requires a transformation matrix that, for many applications, can be difficult or impossible to determine.

Although solutions exist to handle some data consistency problems, software development can be improved by additional concurrency systems to address particular design needs of software developers.

SUMMARY OF THE INVENTION

In general, on one aspect, the invention features a method of maintaining consistency of data objects replicated at multiple computers. Each data object is maintained by a different one of the computers based on the processing of synchronization messages exchanged in peer-to-peer fashion over a network. The synchronization messages include a current operation parameter and a previous operation parameter that are processed to determine how and when the replicated data objects should be manipulated. The current operation parameter identifies an operation that is to be executed (i.e., performed) to update a data object at a computer receiving the synchronization message. The current operation parameter also includes data enabling the receiving computer to execute the current operation in a manner enabling synchronization of that computer with the sending computer. An execution stage parameter is also sent to identify a correct execution timing for the operation. The previous operation parameter identifies a preceding operation executed by the sending computer, an execution stage at which the preceding operation was executed by the sending computer, and the computer first originating the preceding operation (e.g., an identify of a third computer that had previously instructed the sending computer to execute the identified preceding operation). The data in the current and preceding operation parameter are used to detect different types of conflict scenarios. Data in the synchronization message can also indicate a unique priority level of the sending computer with respect to the other computers.

Implementations may include one or more of the following advantages. The conflict resolution method can work with complex data structures, provide minimal effect on application performance and delay response, and does not add significant message traffic between workstations. The details of one or more embodiments of the invention are set forth in the accompanying drawings and the description below. Other features, objects, and advantages of the invention will be apparent from the description and drawings, and from the claims. dr

DETAILED DESCRIPTION OF THE INVENTION

Figure 2:
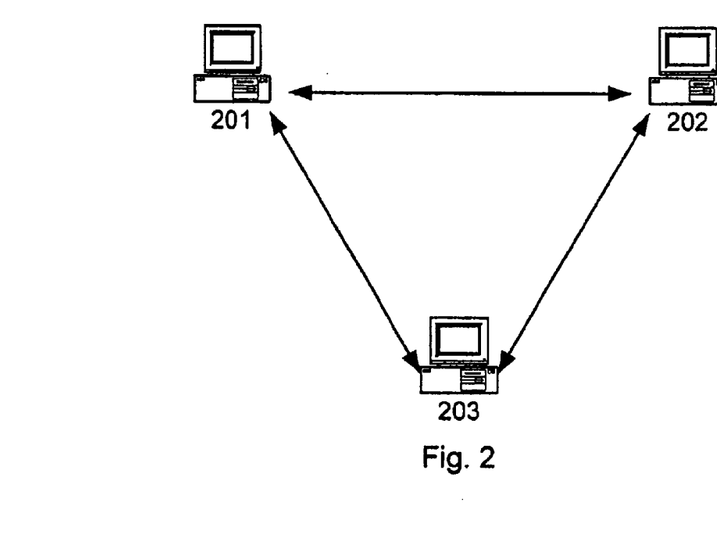
FIG. 2 is a peer-to-peer network.
Figure 3:
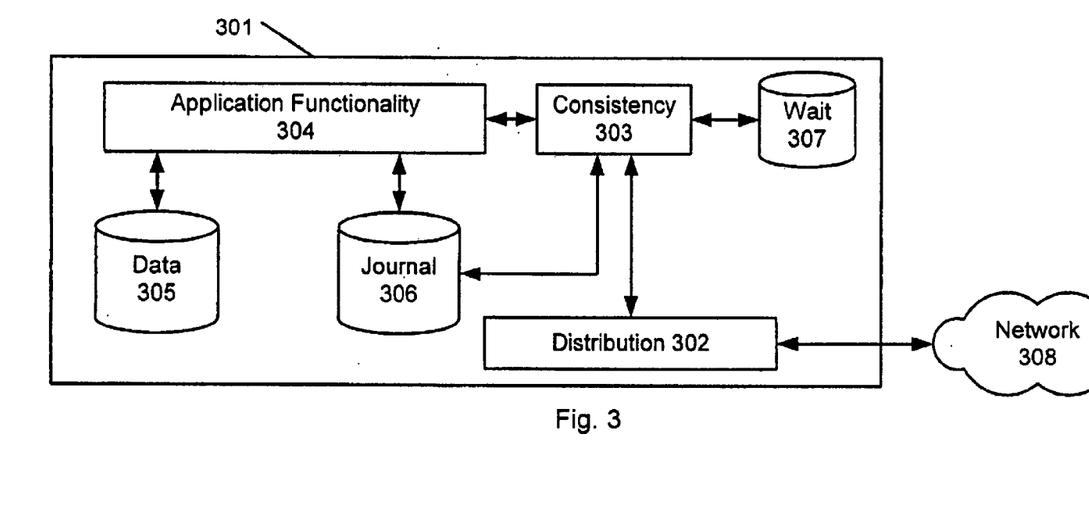
FIG. 3 is a software application architecture.

FIG. 2 shows a group of computers 201–203 that are connected over a network in peer-to-peer fashion. The computers 201–203 execute a groupware application allowing the users at collaboratively modify data (the "shared data object"). FIG. 3 shows the architecture of the groupware application. The application 301 includes functionality 304 to operate on a shared data object 305 that is replicated each of the computers 201–203. The functionality 304 can be, e.g., computer aided design functionality and the shared data object 305 may represent a model of a three-dimensional object. The application 301 also includes a message distribution component 302 that can broadcast (i.e., send) messages to each peer 201–203 and can receive messages over the network 308. Messages distributed by the component 302 can detail operations executed by the application 301 to manipulate the data 305. For example, a message can be broadcast by computer 201 to computers 202–203 instructing computers 202–203 to perform specified application functions 304. In doing so, the message from 201 enables computers 202–203 to synchronize their local copies of the collaborative shared data object 305 without requiring a central synchronization server.

Figure 4:
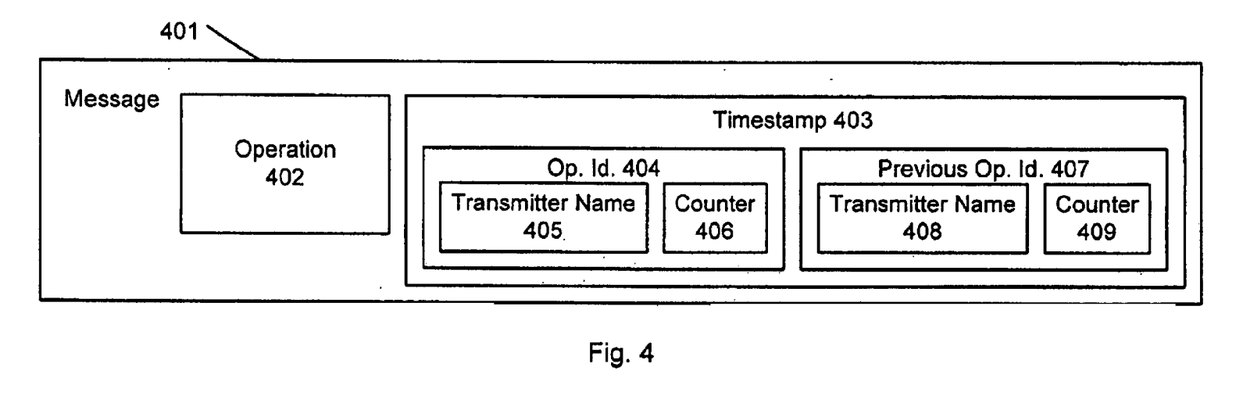
FIG. 4 is a message format.

FIG. 4 shows a message format 401 that can be used for synchronization messages that are exchanged by the distribution component 302. The message 401 includes an operation section 402 that specifies functions 304 to be performed by the application 301, and includes relevant data for performing such functions. For example, the operation section 402 for a computer-aided-design application may include data triggering the application functionality 304 to modify three-dimensional model data 305. The message 401 also includes a timestamp section 403 that includes data used for conflict resolution and maintaining consistency of the shared data object 305 among the peers 201–203.

When a message is received at the distribution component 302 from another computer, the distribution component passes the message to the consistency component 303. The consistency component determines whether the message's operation 402 should be immediately processed by application functionality 304, or placed on waiting list 307. In some cases, the consistency component 303 may determine that one or more previously executed operations must be rolled-back (e.g., through use of an "undo" function) prior to execution of the more recently received operation 402.

Operation roll-back can be supported by storing a journal 306 (i.e., a roll-back queue) detailing a series of previously executed operations and data changes to the shared data object 305. In some cases, an unlimited number of undo operations can be supported, in other cases the number of undo operations supported by a particular implementation may be empirically determined (i.e., there may be a "best guess" as to the size needed to enable functioning of the data synchronization algorithm), and the size of the journal 306 can be adjusted accordingly. The number of roll-back operations that the application 301 may need to support to maintain reliable synchronization operation will depend on factors such as network delay, the speed at which operations can be entered and processed, and acceptable error tolerance levels for the application. Roll-back can be used to correct out-of-order executions (a.k.a., ordering, sequence or temporal errors). To correct sequence errors, the consistency component 303 can trigger functionality 304 to perform one or more roll-back operations. As operations are rolled-back, they can be placed back in the waiting queue 305. This may be necessary because a single operation may be involved in both roll-backs and re-executions depending on the order in which different messages arrive from different computers.

The consistency component 303 can also manage simultaneity conflicts. Simultaneity conflicts occur when operations at two different computers are considered to be executed at the same time (or same sequence position). In one implementation, a waiting list 307, together with undo capabilities, is used to resolve ordering conflicts, and a priority scheme is used to manage simultaneity conflicts. The priority scheme can include assigning different priorities to different computers to determine which of a group of simultaneous operations to execute. As used herein, operations may be considered "simultaneous" because they occurs at a same absolute or logical time, or at a same position in a sequence of operations.

An example of a simultaneous operation occurs in the following situation (i) all of the computers 201–203 have executed ten operations, (ii) users at computers 201 and 202 each independently enter another operation, (iii) computer 201 transmits its new operation message to computers 202–203 prior to receiving the new operation message from 202, and (iv) computer 202 transmits its new operation message to computers 201, 203 prior to receiving the new operation message from 201. In this case, each of computers 201 and 203 sent a message with the same counter value 406 (i.e., a value of eleven) to computer 203. Because the counter values are the same, the operations defined by each of these messages are considered simultaneous by 203 (i.e., they have the same sequence number in a series of operations, regardless of the absolute time (e.g., as measured by a conventional clock) at which the messages were generated at 201–202).

The consistency component 303 can resolve simultaneity errors using a priority scheme to determine which of a collection of simultaneous operations is to be executed and which to reject. The priority scheme can use a number of different strategies to assign priorities. Strategies include alphabetical ordering based on the unique name or network address of computers originating the messages 401, turning priorities based on the particular operation 402, priorities determined based on network conditions (for example, a client 201 with higher bandwidth connection may have priority over a client 202 with a low-bandwidth connection, or vice versa).

Figure 5:
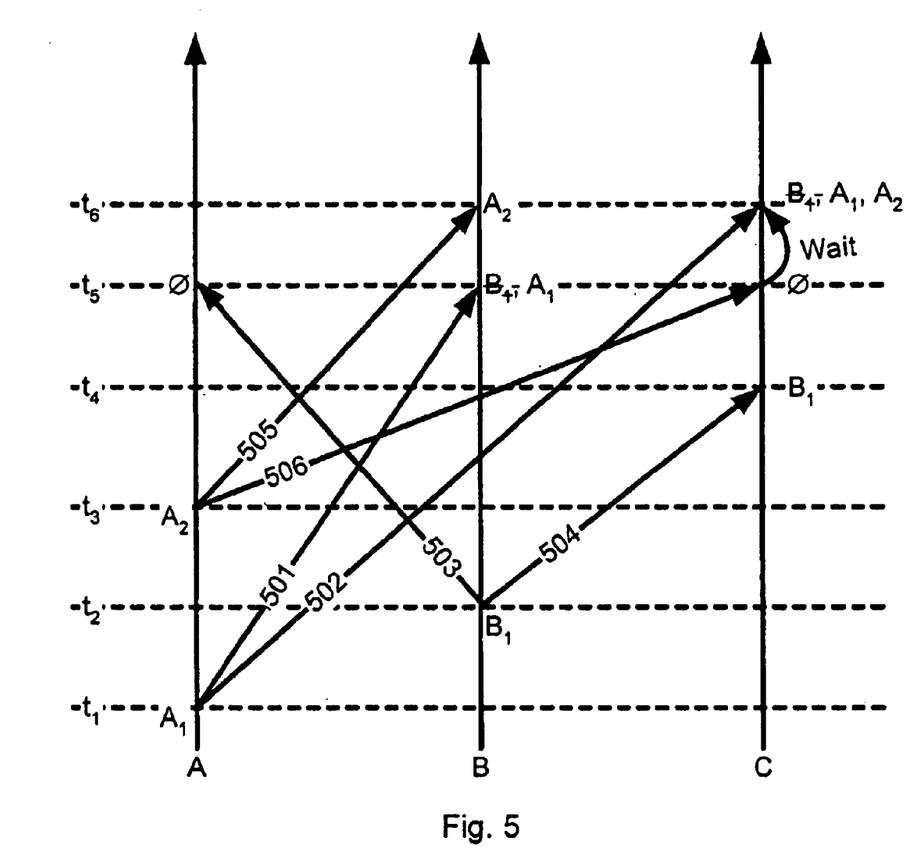
FIG. 5 is a message flow diagram.

Message transmission and processing by workstations 201–203 will now be explained with reference to FIGS. 2–6. For brevity, FIG. 5 shows 201–203 as 'A', 'B', and 'C', respectively, and priorities are assigned to computers 'A', 'B', and 'C' such that messages from 'A' have priority over those from 'B' and 'C' and messages from 'B' have priority over those from 'C'. Initially, the consistency component 303 at each computer 'A', 'B', 'C' (201–203) has a local counter value of zero ($LC_A=LC_B=LC_C=0$), an empty (i.e., null) journal 306, and an empty waiting list 307. Furthermore, the component 303 has a list of all computers ('A', 'B', 'C') in the collaborative group and an identical copy of the shared data object 305.

Figure 6A:
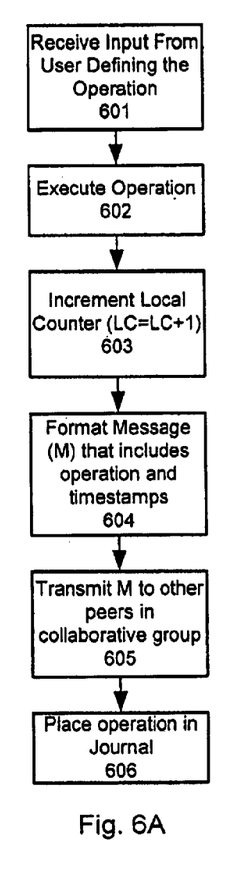
FIGS. 6A and 6B are process flow diagrams.

At time $t_1$, a user at computer 'A' performs an application-specific operation ($A_1$) on a local copy of the shared data object 305 which is then executed at 'A' (step 601–602). 'A' then increments its local counter value $LC_A$ (i.e., $LC_A=LC_A+1=1$) (step 603). The operation $A_1$ is then formatted into messages 501, 502 (step 604) which are sent to 'B' and 'C' (using messages of format 401) (step 605). To generate each of messages 501, 502, the parameters 402–409 are filled-in by the originating computer 'A'. Generally, the parameters 402–409 will be the same in each of 501 and 502 (though other parameters, such as addressing information, may be added to the message 401 and thereby result in differences in messages 501 and 502). The operation parameter 402 is an application-specific parameter that will depend on the functions of a particular collaborative application and data needed for those functions. For example, in a CAD application, the parameter 402 may identify a particular operations (e.g., extrude, cut, fillet, size) that the user at 'A' request on a model or model component and data (e.g., extrude 10 mm, fillet part ID#ABC, etc.).

The timestamp parameters 403 are filled-in using data maintained by the consistency component 303 at 'A'. Timestamp 403 contains two sub-groupings: (i) the current operation timestamp (COT) parameters 404–406, and (ii) the previous operation timestamp (POT) parameters 407–409. The COT parameters convey timing and sequencing information associated with the current operation 402 while the POT parameters convey historical data that can be used to identify conflicts resulting from two different computers sending an operation with the same sequence value 406.

The operation identifier parameter 404 identifies the operation requested by the message 401. Parameter 404 may be redundant with data in parameter 402 and, therefore, some implementations may choose to eliminate parameter 404. The transmitter name parameter 405 is filled in using a unique name distinguishing the sending computer 'A' from other collaborating computers 'B' and 'C'. The transmitter name can be a unique combination of network name assigned to 'A', a user name, a network port number (e.g., an Ethernet address), a random number, or other unique name. Thus, a different unique name is associated with each unique copy of the data 305 that is being synchronized.

Local counter value 406 is a incrementing sequential value that indicates where a particular operation and message (e.g., 501) belongs is in a sequence of executed operations/received messages 501–506 (i.e., it indicates an operational stage of the computer when the operation was executed). Thus, in this example, this "stage" or "time" parameter is a position in a sequence. Other parameters indicating such as absolute time, also may be used. Each computer 'A', 'B', 'C' maintains its local counter value (LC) by beginning with a predetermined initial value (in this example, an initial value of zero) and incrementing by a fixed amount (in this example, one) for each operation executed and, likewise, reducing by the fixed amount (one) for each "undo" operation. For the first synchronization messages 501–502, the local counter value at 'A' ($LC_A$) (which was computed at step 603) is placed in the message parameter 406; thus, parameter 406 in each of 501–502 will have a value of one.

The POT parameters 407–409 contains time stamp parameters that are associated with a preceding operation executed by computer 'A'. The POT parameters are filled-in using COT parameters associated with the most recent previously executed operation stored in the journal 306 at 'A'. When sending initial messages 501–502, the journal is empty and, therefore, the preceding operation timestamp parameters 407–409 are set to a null value.

When sending messages 501–502, computer 'A' will format each message 501–502 with its current local counter value $LC_A$ (i.e., one) in parameter 406. The resulting message is then transmitted to 'B' and 'C' (as messages 501–502) (step 605) and operation $A_1$ is journaled (i.e., placed in database 306) at 'A' (step 606). Implementations may journal a locally generated operation (i.e., $A_1$ at computer 'A') in the same form as used for operations and messages received from other computers (i.e., messages received at 'A' from 'B' and 'C'). Thus, operation $A_1$ can be journaled at 'A' along with all parameters of the broadcast message 501 or 502. As should be apparent, certain of the operations 601–603 may be performed in a different order. For example, step 606 can be performed before or after 605.

At time $t_2$, a user at 'B' enters a operation $B_1$ modifying the local shared data object 305 at 'B' and 'B' transmits synchronization messages 503–504 to computers 'A' and 'C' using the procedure 601–603. Because message 501 was not received at 'B' prior to time $t_2$, 'B' will also transmit messages 503–504 with a local counter value 406 of $LC_B$=1. Similarly, at time $t_3$, the user at 'A' enters an operation $A_2$ that is transmitted by messages 504–505 to 'B' and 'C'. In this case, the parameter 406 of messages 504–505 is set to $LC_A$=2, and the POT parameters 407–409 are set equal to the COT parameters 404–406 associated with the last journaled operation (i.e., parameters 407–409 identify operation $A_1$).

Figure 6B:
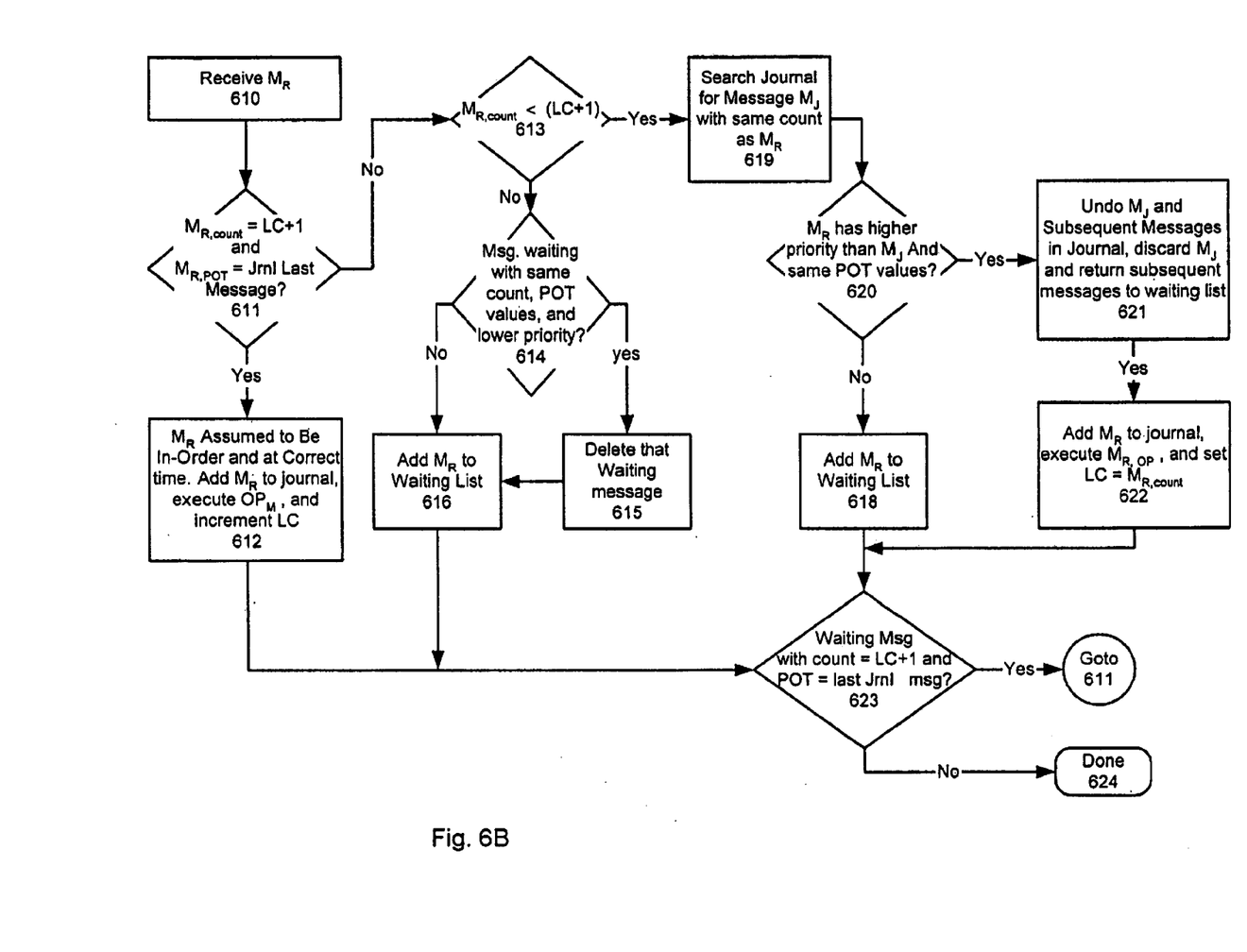

The process for receiving a message 501–506 will now be explained with reference to FIG. 6B. FIG. 6B show a process for resolving conflicts when processing a received messages (designated as "$M_R$"). When a message ("$M_R$") is received at a computer (step 610), the receiving computer will determine if (i) the message is in the proper sequence and ready for execution, or (ii) the message is early and should be placed in waiting list 307, or (iii) there is a simultaneity conflict or ordering conflict.

Received message $M_R$ is tested to determine whether the timestamp parameter 406 (designated "$M_{R,count}$") equals the incremented local counter value at the receiving computer (i.e., LC+1) and the POT parameters 407–409 (designated "$M_{R,POT}$") identify the last message/operation on the journal 306 of the receiving computer (step 611). If so, $M_R$ is considered to be in the proper sequence and the receiving computer will then execute the operation 402 defined by message $M_R$, add $M_R$ to the journal 306, and increment it's local counter (LC=LC+1) (step 612). The receiving computer will then determine whether its waiting list 307 contains an additional message with a counter 406 equal to the again-incremented value of the receiving computer's local counter (i.e., ((LC+1) from step 612)+1), and with POT parameters equal to the COT parameters of the last journaled message (step 623). If so, that waiting message is removed from the waiting list and processed as $M_R$ beginning at step 611, otherwise the computer returns to other processing task and user interactions, or to waiting for messages (step 624).

If step 611 indicates that $M_R$ is not ready for processing via step 612, then $M_R$ may be too early and/or a simultaneity conflict may exist. In this case, the timestamp parameter of the received message ($M_{R,count}$) is compared to the local counter value LC+1 (step 613 ). If the value of the message timestamp (406, $M_{R,count}$) is greater than or equal to the local counter value LC+1, then message $M_R$ is early ($M_{R,count}$> (LC+1)) message and/or a simultaneity conflict may exist (if $M_{R,count}$=(LC+1)). In this case, the waiting list 307 is searched to determine if there exist a waiting message with the same count 402 and previous operation timestamp 407–409 values as $M_R$ but with a lower priority than $M_R$ (step 614 ). If so, that waiting message is deleted 615. In any case, $M_R$ is added to the waiting list 616 (a subsequent pass through the algorithm of FIG. 6B will be needed to resolve the simultaneity conflict). Processing then continues through steps 623 and 624.

If step 613 determines that the counter value 406 is less than the value of (LC+1), a sequencing conflict may exist. That is, another operation with the same value in counter 406 was previously processed. In this case, the journal is searched to find that previously processed message (designated "$M_J$") (step 619). If $M_R$ has a higher priority than $M_J$, and the same POT parameter values (407–409) (i.e, $M_{R,POT}=M_{J,POT}$), then $M_J$ and all subsequent messages are undone(step 621). $M_R$ is then executed, added to the journal, and the local counter is set to the value of parameter 406 (step 622). Otherwise, $M_R$ is added to the waiting list (step 618). As messages are undone (step 621), they may be replaced in the waiting queue 305 for possible subsequent re-execution. For example, re-execution may occur if the "undone" messages are to be properly executed following $M_R$ or if a synchronization message from another computer causes a later "undo" process 621 in which it is determined that some of the "undone" messages should be executed.

Referring back to FIG. 5, at time $t_4$, message 504 is received at 'C'. Message 504 is processed as an "normal" message (i.e., no conflict is indicated). That is, message 504 is processed by performing the process steps 610→611→612→623→624.

At time $t_5$, message 501 is received at 'B', message 503 is received at 'A' and message 506 is received at 'C'. In this case, processing at 'A', 'B', and 'C' is at follows:

At 'A': At time $t_5$, parameter 406 of message 503 has a value of one and $LC_A$ has a value of two. As a result, processing occurs along the path 610→611→613→619. At step 619, the journal 306 at 'A' is searched for a message with the same count as that of 503. Message 501 is thereby found. The priority and POT values of messages 501 and 503 are compared (step 620). In this example, the message from 'A' (i.e., 501) has a higher priority than that from 'B' and, consequently, the received message 503 is discarded (steps 618). Processing then continues along steps 623→624.

At 'B': At time $t_5$, parameter 406 of message 501 has a value of one and $LC_B$ has a value of one. As with processing at 'A', processing at 'B' occurs along the path 610→611→613→619. The search of journal 306 locates operation $B_1$ which originated from 'B' at time $t_2$. The priority of messages 501 and 503 (i.e., operation $B_1$), as well as their POT values, are compared (step 620) resulting in continuation of processing at step 621. Step 621 invokes "undo" functionality to undo operation $B_1$ and remove it from B's journal. Message 501 is then executed, added to the journal, and $LC_B$ is set to the value of message 501's count parameter 406.

At 'C': At time $t_5$, parameter 406 of message 506 equals the local counter+1 at 'C' ($LC_C$+1), but the POT parameters 407–409 do not identify the last journaled operation at 'C'. As a result, message processing flows along the path 610→611→613→614. Step 614 searches the waiting message queue 307 at 'C' to determine if there is a waiting message with the same count value 406 and POT values 407–409 in message 506. In this case, there is no such message and $M_R$ is added to the waiting list 307. Processing continues with steps 623→624.

At time $t_6$, message 505 is received at B and message 502 is received at 'C'. Processing of message 505 at 'B' is straightforward and occurs along path 610→611→612→623→624. Processing of message 502 at 'C' occurs along path 610→611→613→619 (which identifies message 504 in the journal)→620 (which determines that message 502 has priority over message 504)→621 (which performs an "undo" function on message 504)→622 (which executes the operation (designated "$M_{R,OP}$") specified in message 506)→623. At step 623, it is detected that message 506 is in the queue 307 and is now ready for processing. Message 506 is then processed as $M_R$ along the processing path 611→612→623→624. Following time $t_6$, each of 'A', 'B', and 'C' will have executed and journaled operations $A_1$ and $A_2$ and discarded operations $B_1$, and $B_2$.

In most implementations, only one instance of the application 301 will execute on a computer 201. However, it is conceivable that implementations may execute multiple instances of the application 301 on each computer. For example, if a computer supports multiple users each executing their own instance of the application 301. In such cases, each "instance" can be viewed as executing on a logically separate computer and treated as such. For example, a separate message 401 will be sent to each instance of the application on each computer and each instance will have a unique name 405.

A pseudo-code implementation of one implementation of the message transmission, receiving, and processing algorithms described above is as follows:

Algorithm for Broadcasting a Message from a Computer ("A") Originating a Change in the Shared Data Object:

Execute the operation (e.g., operation '$A_1$,') at the originating computer (i.e., computer "A")

Local counter at originating computer=Local counter+1 ($LC_A$=$LC_{A}$+1)

Broadcast of the operation ('$A_1$') with a timestamp via messages (501–502) to each peer ("B", "C"). Set parameters of the transmitted message as follows:

Transmitter name parameter 405=Name ("A")

Counter parameter 406=Local counter at originating computer ($LC_A$)

Set previous operation parameters 407–409 to parameters 404–406 of the last executed/journaled operation (Set to a Null value for the first operation exchanged)

Record the operation in the journal 306 along with parameters of the synchronization message 401.

Algorithm for Receiving and Processing Message ($M_R$) at a Computer

Process the received message ("$M_R$", 401) at each receiving computer using the following message processing algorithm (executed independently at each receiving computer):

Algorithm for processing a received message: do the following

```
{ /* Start Processing Algorithm */
    [Execution] If the counter value 406 of M_R is equal to (the local
    counter of the receiving computer + 1) and if the previous operation
    parameters 407–409 of M_R are equal to the parameters 404–406 of
    the last operation executed at the receiving computer (i.e., the last
    operation in journal 306), then
    {
        Execute the operation defined by M_R;
        Local counter at receiving computer = local counter + 1;
        Add the operation M_R to the journal at the receiving
        computer;
    }
    Else
    { /* Determine if a simultaneity conflict exists */
        If the counter parameter value 406 of M_R is lower
        than (local counter + 1) of the receiving computer,
        a simultaneity conflict has occurred (i.e., another
        synchronization message M_J with the same counter
        value 406 as M_R was previously executed at the receiving
        computer), then:
        {
            Search journal 306 at the receiving computer to find
            the message M_J with the same counter value
            406 as the value of 406 in M_R;
            If (the priority of message M_R is greater than the
            priority of the simultaneous operation
            M_J) and (the previous operation parameters
```

-continued

```
        407-409 of M_R are equal to
        the parameters 404-406 of M_J), then
        {
            Cancel (undo) M_J and all subsequently
            executed operation (e.g., by undoing opera-
            tion in a last-in-first-out (FIFO) order using
            data recorded in the journal 306);
            Execute the operation defined by M_R;
            Local counter = value of operation counter
            406 of M_R;
            Add the operation M_R to the journal;
        }
        Else, { add the message M_R to the waiting list }
    }
    [Ordering] Else
    {
        If the waiting list contain a message (x) whose
        the counter is equal to the one of the message,
        whose the previous operation is equal to
        the one of the message, and whose the priority
        is lower than the one of the message,
            then {replace x with the message }
            Else, { add the message to the waiting list }
    }
}
/* End Processing Algorithm */
}
```

While the waiting list at the receiving computer 307 contain a message with a counter 406 equal to (the local counter+1) of the receiving computer and with previous operation parameters 40t–409 equal to the parameters 407–409 of the last journaled operation, remove that message from the waiting list and process it as a new received message $M_R$ using the preceding processing algorithm In some cases, an application may execute certain operations that cannot be rolled back. If a particular operations cannot be rolled-back after execution (e.g., due to a one-way transformation of data), a pessimistic locking strategy may be used prior to such a non-reversible operations to ensure that each computer 201–203 has a consistent copy of the shared data object 305 before execution of the non-reversible operation. The computer, e.g., computer 201, requesting the pessimistic lock may provide a copy of the timestamp 403 associated with it's most recently executed operation when requesting the pessimistic lock. That most-recently-executed operation's timestamp can be compared with timestamp information in the journal 306 at each other computer 202–203 to ensure that each computers 201–203 has a consistent view of the data 305. If the data 305 is not consistent, the lock may be denied. The denying computer may return the timestamp information associated with its most recently executed operation to notify the lock-requesting computer of the expected current state. The lock requesting computer may wait until it has properly synchronized (i.e., it obtains the proper state) before re-requesting the pessimistic lock Thus, pessimistic locking can be transparently employed by the consistency component 303 when required. Such a pessimistic locking strategy may also be initiated by a computer if its waiting queue 305 has a large number of messages in it or messages that have spent a large amount of time in the queue. In some cases, the queue 305 may have messages that will never be executed (this may occur in some synchronization message exchange scenarios). By employing occasional pessimistic locking and synchronization, the computers 201–203 can determine that any queued messages existing after a pessimistic synchronization should be discarded.

In some cases, the operation identified by parameter 402 may be a complex operation consisting of multiple sub-operation that are executed as a single atomic transaction (i.e., all operations either succeed or fail together). A CAD system user interface may include an selectable function allowing a user to batch a group of operations together. For example, the user may click on a "start batch" symbol when beginning to enter a complex transaction and a "completed" symbol when the transaction has been entered and is to be sent to other computers. A complex operation also may be automatically generated, e.g., by a macro function. Thus, parameter 402 may be of variable size and may include multiple sub-components depending on particular operational needs. Parameters 404 and 407 may be similarly adapted to identify multiple sub-parts.

The invention may be implemented in digital electronic circuitry, or in computer hardware, firmware, software, as computer code as stored on a data storage media, or in combinations of such. Computers may be interconnected over a variety of network types including fixed (wired) networks, wireless, mobile wireless, and other network types. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

What is claimed is:

1. A method of maintaining consistency of a plurality of data objects, each data object being maintained by a different one of a plurality of computers that are operatively connected to each other by a network, the method comprising, at a first one of the computers in response to a received user input:

executing a current operation modifying a first one of the data objects that is maintained by the first computer;

formatting a synchronization message, the message comprising:

a current operation parameter comprising data identifying said current operation, data enabling another computer to execute said current operation in a manner enabling synchronization of the first computer and the other computer, and execution stage data identifying an operational stage for execution of the current operation, and a previous operation parameter comprising data identifying a preceding operation executed by the first computer and execution stage data identifying an operational stage at which said preceding operation was executed by the first computer, a parameter identifying a unique priority level of the first computer with respect to others of the plurality of computers; and transmitting the synchronization message from the first computer to others of the plurality of computers.

2. The method of claim 1 wherein the previous operation parameter further comprises a parameter identifying a one of the plurality of computers originating the preceding operation, said computer being other than the first computer.

3. The method of claim 1 wherein transmitting from the first computer to others of the plurality comprise transmitting using peer-to-peer network transmission.

4. The method of claim 3 wherein the method further comprises:

storing at the first computer a network identification of each of the other computers to enable the transmitting by the first computer to each of the other computers.

5. The method of claim 1 wherein the parameter identifying a unique priority level comprises a network identification of the first computer.

6. A data storage media comprising stored instructions for configuring a computer processor to perform the method of claim 1.

7. A computer-implemented method of maintaining consistency of a plurality of data objects, each data object being maintained by a different one of a plurality of computers that are operatively connected to each other by a network, and the method being performed at a first one of the plurality of computers to maintain a first one of the data objects, the method comprising:

receiving a synchronization message from a second one of the plurality of computers, the synchronization message comprising:

a current operation parameter comprising data identifying a first operation that was executed by the second computer, data required for execution of the first operation at the first computer to manipulate the first data object in a manner effecting synchronization of the first and the second computer, a first execution stage parameter identifying an operational stage at which the first operation was executed by the second computer, and a value identifying the second computer, a previous operation parameter comprising a parameter identifying a second operation that was executed by the second computer prior to execution of the first operation, a second execution stage parameter identifying an operational stage at which said second operation was executed at the second computer, and an identity of a computer originating said second operation, a parameter identifying a unique priority level of the second computer with respect to others of the plurality of computers; and updating the first one of the data objects by executing the operation identified by the current operation parameter at the first computer when the first computer is at a correct execution stage.

8. The method of claim 7 wherein the identity of the computer originating said second operation comprises a network identity of said originating computer.

9. The method of claim 7 wherein updating when the first computer is at a correct execution stage further comprises:

comparing the current operation parameter and the previous operation parameters to local state data stored at the first computer, the local state data comprising data indicating a current execution stage and a last executed operation; and executing the first operation when the local state data indicates that a current execution stage at the first computer corresponds to the execution stage indicated by the first execution stage parameter and the previous operation parameter identifies the last operation executed at the first computer.

10. The method of claim 9 further comprising:

storing the synchronization message in a waiting list when the current execution stage at the first computer is earlier than a execution stage for the operation identified by the first execution stage parameter.

11. The method of claim 10 wherein storing the synchronization message further comprises:

deleting from the waiting list a synchronization message having a lower execution priority and a same first execution stage parameter value as for the synchronization message and a same second execution stage parameter value as for the synchronization message.

12. The method of claim 9 wherein, when the local state data indicates that the first computer is at an execution stage subsequent to the execution stage indicated by the first execution stage parameter:

searching a journal of operations executed by the first computer to locate a journaled operation executed at a same execution stage as indicated by the first execution stage parameter, and when said journaled operation has a lower execution priority than the execution priority associated with the first synchronization message, undoing said journaled operation and subsequent operations and then executing the operation identified by the first synchronization message.

13. The method of claim 12 wherein undoing said journaled operation and subsequent operations comprises undoing only when the previous operation parameter identifies a same operation as was executed prior to execution of said journaled operation.

14. The method of claim 12 wherein undoing operations comprises storing each undone operation in a waiting queue to enable subsequent re-execution of said undone operations.

15. The method of claim 12 further comprising:

when said journaled operation has a higher execution priority than the execution priority associated with the first synchronization message, storing the first synchronization message in the waiting list.

16. A data storage media comprising stored instructions for configuring a computer processor to perform the method of 7.

17. A computer system comprising:

a processor;

a network interface coupled to the processor and operatively coupling the computer system to a plurality of other computer systems;

a memory coupled to the processor and storing a first data object, said first data object being a local replica of data replicated at others of the plurality of computers;

a local state module configured to record data effecting manipulations of the first data object, said local state module comprising memory recording operations effecting synchronization of the first data object; and a consistency module coupled to the processor and memory and operating to maintain consistency of the first data object with replicas of the data object that are stored at the other computer systems, said maintaining being performed based on processing of received synchronization messages, each received synchronization message comprising:

a current operation parameter comprising data identifying a first operation that was executed by another computer, data required for execution of the first operation so as to manipulate the first data object in a manner effecting synchronization of the first data object with a data object stored at the other computer, a first execution stage parameter identifying an operational stage at which the first operation was executed by the other computer, and a value identifying the other computer, and a previous operation parameter comprising a parameter identifying a second operation that was executed by the other computer prior to execution of the first operation, a second execution stage parameter identifying an operational stage at which said second operation was executed at the other computer, and an identity of a computer originating said second operation.

18. The system of claim 17 wherein the local state module comprises stored instructions to configure the processor to:

compare the current operation parameter and the previous operation parameter to data maintained by the local state module indicating a current execution stage of the system with respect to manipulations of the first data object and a last operation effecting the first data object;

instruct the consistency module to update the first data objects by performing an operation identified by the current operation parameter when the system is at a correct execution stage;

store the synchronization message in a waiting list when the system is at an earlier execution stage than that identified by the first execution stage parameter; and delete from the waiting list a synchronization message having a lower execution priority and a same first execution stage parameter value as for the synchronization message and a same second execution stage parameter value as for the synchronization message.

* * * * *